(12) United States Patent
Schmidt et al.

(10) Patent No.: US 7,166,050 B2
(45) Date of Patent: Jan. 23, 2007

(54) POWERTRAIN WITH AN ELECTRICALLY-VARIABLE TRANSMISSION

(75) Inventors: Michael R. Schmidt, Carmel, IN (US); Donald Klemen, Carmel, IN (US); Alan G. Holmes, Clarkston, MI (US)

(73) Assignee: General Motors Corporation, Detroit, MI (US)

(*) Notice: Subject to any disclaimer, the term of this patent is extended or adjusted under 35 U.S.C. 154(b) by 156 days.

(21) Appl. No.: 11/058,574

(22) Filed: Feb. 15, 2005

(65) Prior Publication Data

US 2006/0183588 A1    Aug. 17, 2006

(51) Int. Cl.
*F16H 3/72*    (2006.01)
(52) U.S. Cl. .......................................... 475/5
(58) Field of Classification Search ............... 475/5, 475/8, 317, 320; 903/909, 910, 908, 911; 180/372
See application file for complete search history.

(56) References Cited

U.S. PATENT DOCUMENTS

| | | | | |
|---|---|---|---|---|
| 3,799,284 A | * | 3/1974 | Hender .................. | 180/65.2 |
| 5,195,600 A | * | 3/1993 | Dorgan .................. | 180/9.1 |
| 5,931,757 A | * | 8/1999 | Schmidt ................. | 475/2 |
| 5,935,035 A | * | 8/1999 | Schmidt ................. | 475/5 |
| 6,524,215 B1 | * | 2/2003 | Schmidt ................. | 477/3 |
| 6,537,167 B1 | * | 3/2003 | Gazyakan et al. ....... | 475/5 |
| 6,953,409 B1 | * | 10/2005 | Schmidt et al. ......... | 475/5 |
| 7,059,986 B1 | * | 6/2006 | Schmidt ................. | 475/5 |
| 2003/0078126 A1 | * | 4/2003 | Holmes et al. .......... | 475/5 |
| 2003/0178953 A1 | * | 9/2003 | Tumback et al. ........ | 318/8 |
| 2004/0200648 A1 | * | 10/2004 | Tarasinski et al. ...... | 180/65.7 |
| 2004/0251862 A1 | * | 12/2004 | Imai ...................... | 318/376 |
| 2006/0180366 A1 | * | 8/2006 | Brill et al. .............. | 180/65.6 |

* cited by examiner

*Primary Examiner*—Roger Pang
*Assistant Examiner*—Justin K. Holmes
(74) *Attorney, Agent, or Firm*—Dan L. Thompson

(57) ABSTRACT

A powertrain incorporates two electrical units, two planetary gearsets in a radially-stacked package to provide a shortened length of the transmission. The output members of the electrical units are interconnected by a gear mechanism, which is drivingly connected with a conventional differential mechanism, which is aligned within the radial package of the electrical units. The electrical units combine with power from an engine to provide a two-mode compound-split electrically-variable transmission.

2 Claims, 4 Drawing Sheets

POWERTRAIN WITH AN ELECTRICALLY-VARIABLE TRANSMISSION

TECHNICAL FIELD

This invention relates to hybrid powertrains and, more particularly, to hybrid powertrains having electrically-variable transmissions for use in front wheel drive applications.

BACKGROUND OF THE INVENTION

Passenger vehicles and trucks incorporate a powertrain having a multi-speed transmission. Initially, these transmissions were countershaft-type transmissions with very few planetary gearsets. As time progressed, however, planetary gearsets became the more popular powertrain option, particularly in the United States.

These transmissions, both planetary and countershaft, have been developed more recently to provide more drive ratios that are selectively operable between an engine and a powertrain output. The number of ratios in these transmissions has increased from two to seven or more ratios. With each additional ratio, an additional ratio interchange is required, which requires interchanges of torque-transmitting mechanisms (clutches and brakes) and the resulting speed changes of transmission elements as well as engine speed changes.

To reduce the number of ratio interchanges or interchange events, it has been considered that variable speed transmissions would be advantageous. Variable speed transmissions have continuous ratio change such that a ratio interchange event is not evident. Most variable transmissions or continuously-variable transmissions (CVTs) have taken the form of hydraulically-variable units, electrically-variable units, and friction belt units.

Friction belt units have been used in many small implement applications such as tractors and snow machines and currently become popular with automobiles. The variable speed transmissions lend themselves well to improved vehicle economy and vehicle performance. In the line of vehicle economy, the engine can be operated at the most efficient fuel consumption rate while the vehicle ratio in the powertrain is adjusted by using the transmission. With a continuously variable transmission, the requirement of having a fixed ratio for an area of performance is no longer required.

SUMMARY OF THE INVENTION

It is an object of the present invention to provide an improved powertrain having an electrically-variable transmission.

In one aspect of the present invention, the electrically-variable transmission is especially adapted for use with front drive or transverse drive powertrains.

In another aspect of the present invention, a transmission within the powertrain includes two electrical units and two planetary gearsets or units, which are interconnected with a transmission output mechanism.

In yet another aspect of the present invention, the transmission employs two range torque-transmitting mechanisms and one cruise torque-transmitting mechanism.

In still another aspect of the present invention, the electrical units and the planetary gear units are radially stacked to reduce the overall length of the transmission portion of the powertrain.

In yet still another aspect of the present invention, the electrical units and the planetary gearsets cooperate to provide a two-mode compound-split electrically-variable transmission.

In a further aspect of the present invention, interchanges of the torque-transmitting mechanisms are accomplished at synchronous speeds.

DESCRIPTION OF AN EXEMPLARY EMBODIMENT

Figure 1:
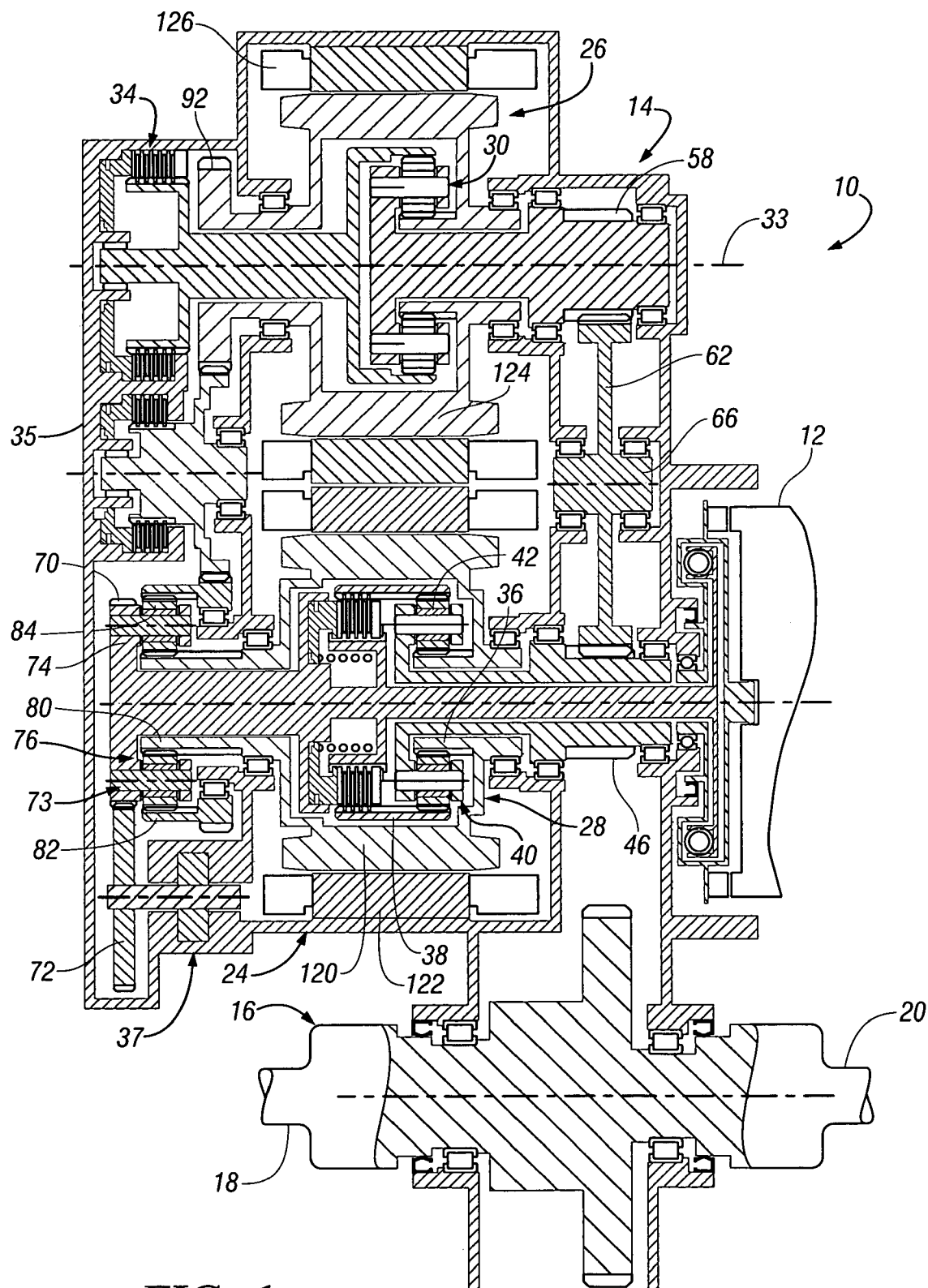
FIG. 1 is an elevational view of a powertrain incorporating the present invention.
Figure 3:
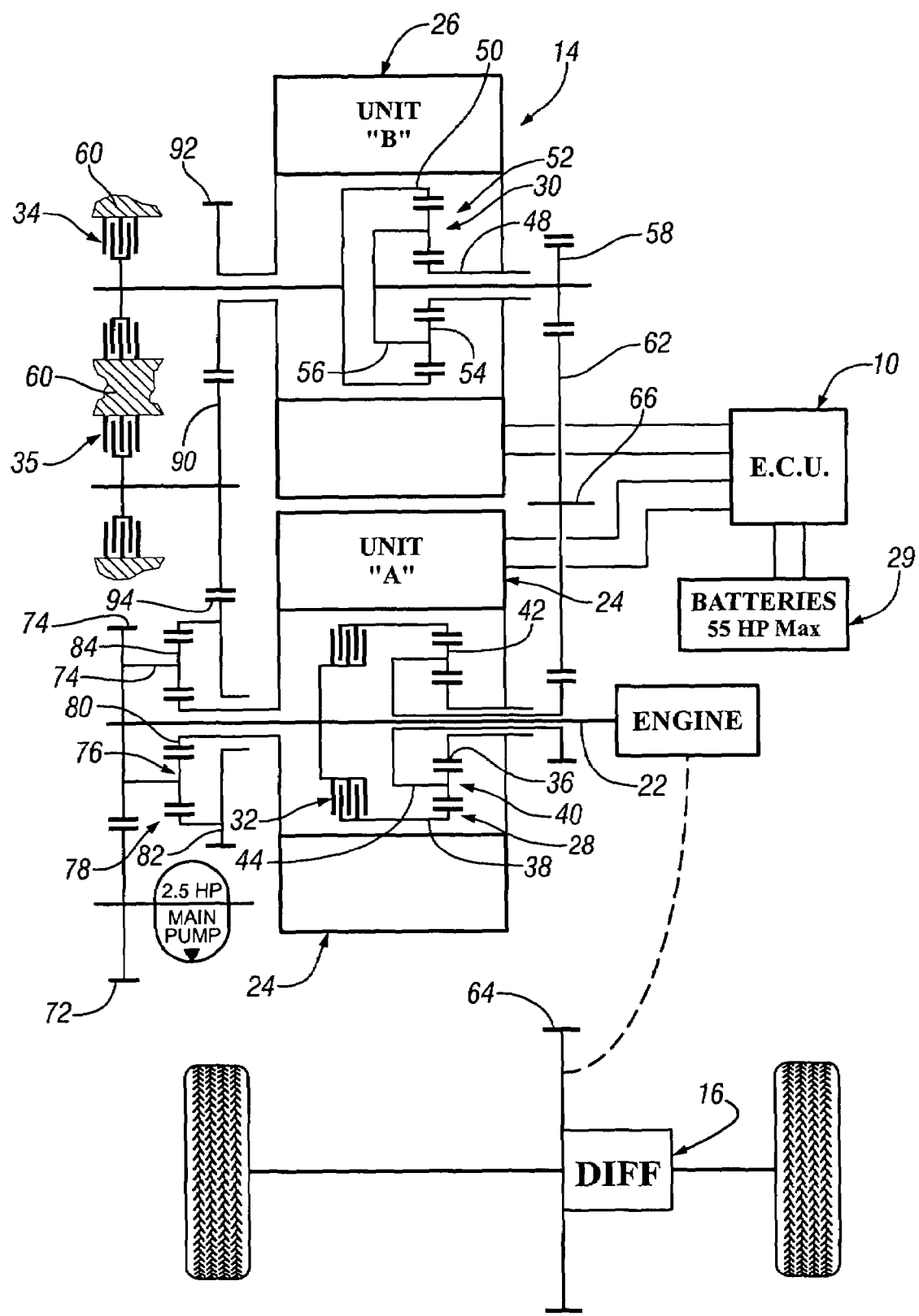
FIG. 3 is a schematic representation of the powertrain shown in FIG. 1.

As best seen in FIGS. 1 and 3, an electrically-variable powertrain 10 includes an engine 12, an electrically-variable transmission (EVT) 14, and an output mechanism or final drive mechanism 16. The engine 12 is a conventional internal-type combustion engine, and the output mechanism 16 is a conventional differential unit having two output shafts 18 and 20.

The electrically-variable transmission 14 includes an input shaft 22, a first electrical unit 24, a second electrical unit 26, a first planetary gearset 28, a second planetary gearset 30, three selectively engageable torque-transmitting mechanisms 32, 34, and 35, and a hydraulic pump 37, which is adapted to supply control fluid for the selectively engageable torque-transmitting mechanisms 32, 34, and 35, as well as lubrication for the vehicle transmission.

The transmission 14 also has an electrical control unit (ECU), which incorporates a conventional programmable digital computer. The ECU provides signals to and from the electrical units 24 and 26 as well as signals and electrical power from a battery pack 29. The electrical units 24 and 26 are capable of operating as motors or generators and do so during the operation of the powertrain. The electrical control unit (ECU) provides the signals and power to and from the electrical units 24 and 26 during their operation as either a motor or a generator. The battery pack 29 provides power to the units when power in access of that available from the engine is required and/or when engine operation is not desired. The batteries can be charged from the electrical units 24 and 26 when operated as generators.

Figure 2:
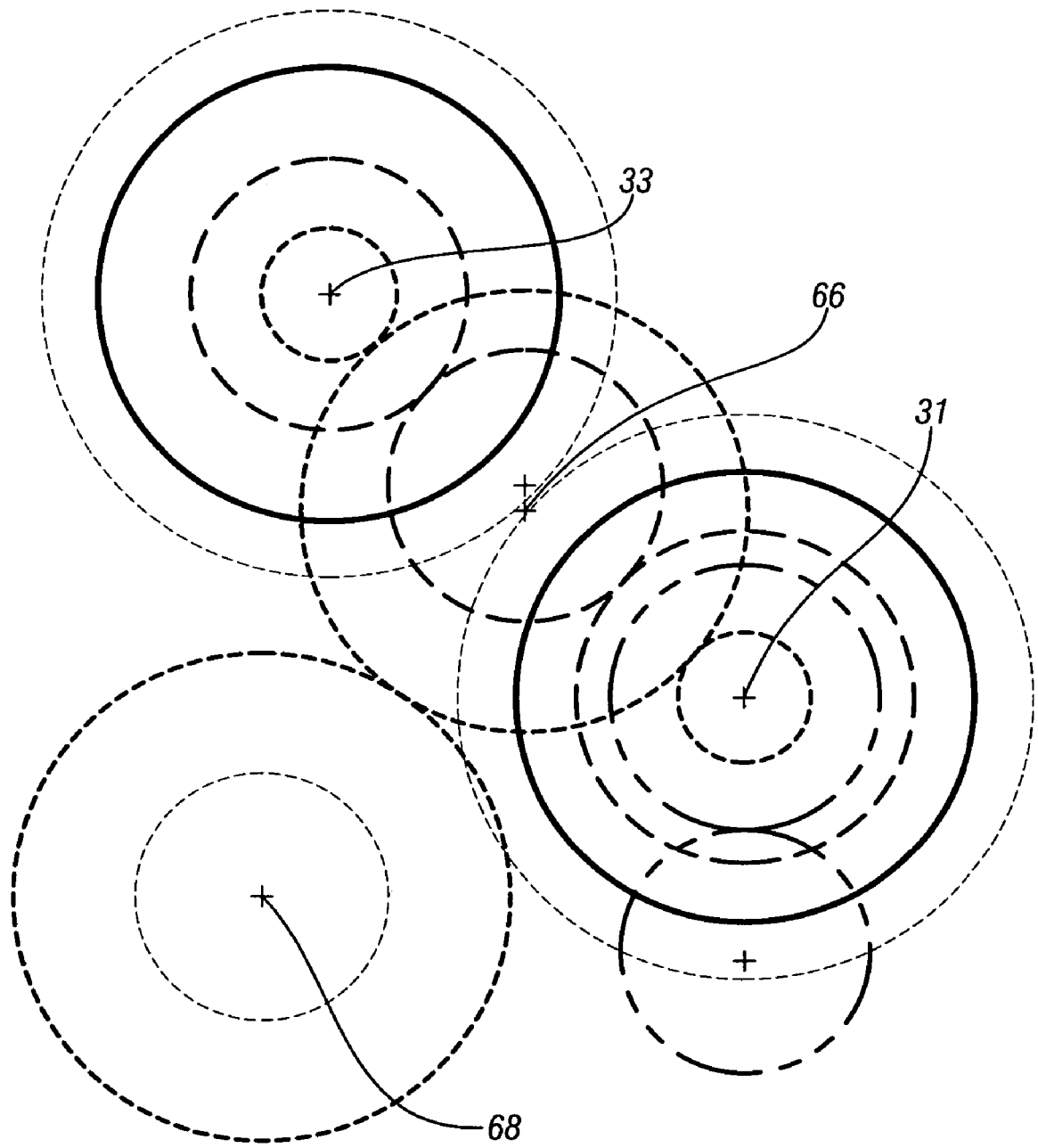
FIG. 2 is an end view of the powertrain shown in FIG. 1 describing the centerline for the various gearing elements.

The engine 12 and input shaft 22 have a centerline 31. The electrical unit 24 has the same centerline 31. The electrical unit 26 has a centerline 33. As can be seen in FIG. 2, the centerlines 31 and 33 are aligned radially.

The planetary gearset 28 includes a sun gear member 36, a ring gear member 38, and a planet carrier assembly member 40 having a plurality of pinion gears 42 rotatably mounted on a planet carrier member 44 and disposed in meshing relationship with the sun gear member 36 and the ring gear member 38. The sun gear member 36 is continuously drivingly connected with the electrical unit 24, the planet carrier member 44 is continuously drivingly connected with an output gear 46, and the ring gear member 38 is selectively connectible with the input shaft 22 through the selectively engageable torque-transmitting mechanism 32.

The planetary gearset 30 includes a sun gear member 48, a ring gear member 50, and a planet carrier assembly member 52, which includes a plurality of pinion gears 54 rotatably mounted on a planet carrier member 56 and disposed in meshing relationship with the sun gear member 48 and the ring gear member 50. The sun gear member 48 is continuously drivingly connected with the electrical unit 26, the planet carrier member 56 is drivingly connected with an output gear 58, and the ring gear member 50 is selectively connected with a stationary portion 60 of the power transmission 14 through the torque-transmitting mechanism 34.

The output gear 46 is rotatably disposed on the centerline 31 of the input shaft 22 and the output gear 58 is disposed on the centerline 33 of the electrical unit 26. The output gears 58 and 46 are continuously interconnected by a gear member 62, which meshes with an output gear 64 of the final drive mechanism 16. The gear 62 is rotatably disposed on a centerline 66, which is radially aligned with the centerlines 31 and 33 and the final drive mechanism 16 and the output shafts 18 and 20 thereof are aligned on a centerline 68. The positioning of the centerlines 31, 33, 66, and 68 is seen in FIG. 2.

The pump 37 is drivingly connected with the engine 12 and input shaft 22 through a pair of gears 70 and 72. The gear 70 is formed on a planet carrier member 74, which is a member of a planet carrier assembly 76. The planet carrier assembly 76 is a portion of a planetary gearset 78, which also includes a sun gear member 80 and a ring gear member 82. The planet carrier assembly 78 also includes a plurality of pinion gears 84, which continuously mesh with the sun gear member 80 and the ring gear member 82.

The planet carrier 74 is drivingly connected with the input shaft 22 and the ring gear member 82 is drivingly connected with the torque-transmitting mechanism 35. The torque-transmitting mechanism 35 is also connected with the stationary portion 60 of the transmission 14. Thus, the torque-transmitting mechanisms 34 and 35 are hydraulically operated devices, commonly termed brakes, and the torque-transmitting mechanism 32 is a hydraulic device, commonly termed a clutch. The torque-transmitting mechanism 32 is selectively operable to connect the input shaft 22 with the ring gear member 38. Thus, when the torque-transmitting mechanism 32 is engaged, the engine 12 directly drives the ring gear member 38. When the torque-transmitting mechanism 34 is engaged, the ring gear member 50 is held stationary. When the torque-transmitting mechanism 35 is held stationary, a transfer gear 90 is held stationary. The transfer gear 90 meshes with a gear 92, which is drivingly connected with the electrical unit 26 and also with a gear 94, which is drivingly connected with the ring gear member 82. Thus, the ring gear member 82 and electrical unit 26 are held stationary whenever the torque-transmitting mechanism 35 is engaged.

The powertrain 10 provides two modes of operation, a low-reverse input split mode and high forward compound-split mode. These two ranges of operation are provided by the engagement of torque-transmitting mechanism 34 and the engagement of torque-transmitting mechanism 32. The low or first range is provided by the engagement of the torque-transmitting mechanism 34, as seen in FIG. 3, and the higher range is provided by the engagement of the torque-transmitting mechanism 32. The reverse range is provided by the engagement of the torque-transmitting mechanism 34, and therefore the torque-transmitting mechanism 34 is engaged through the neutral condition.

Figure 4:
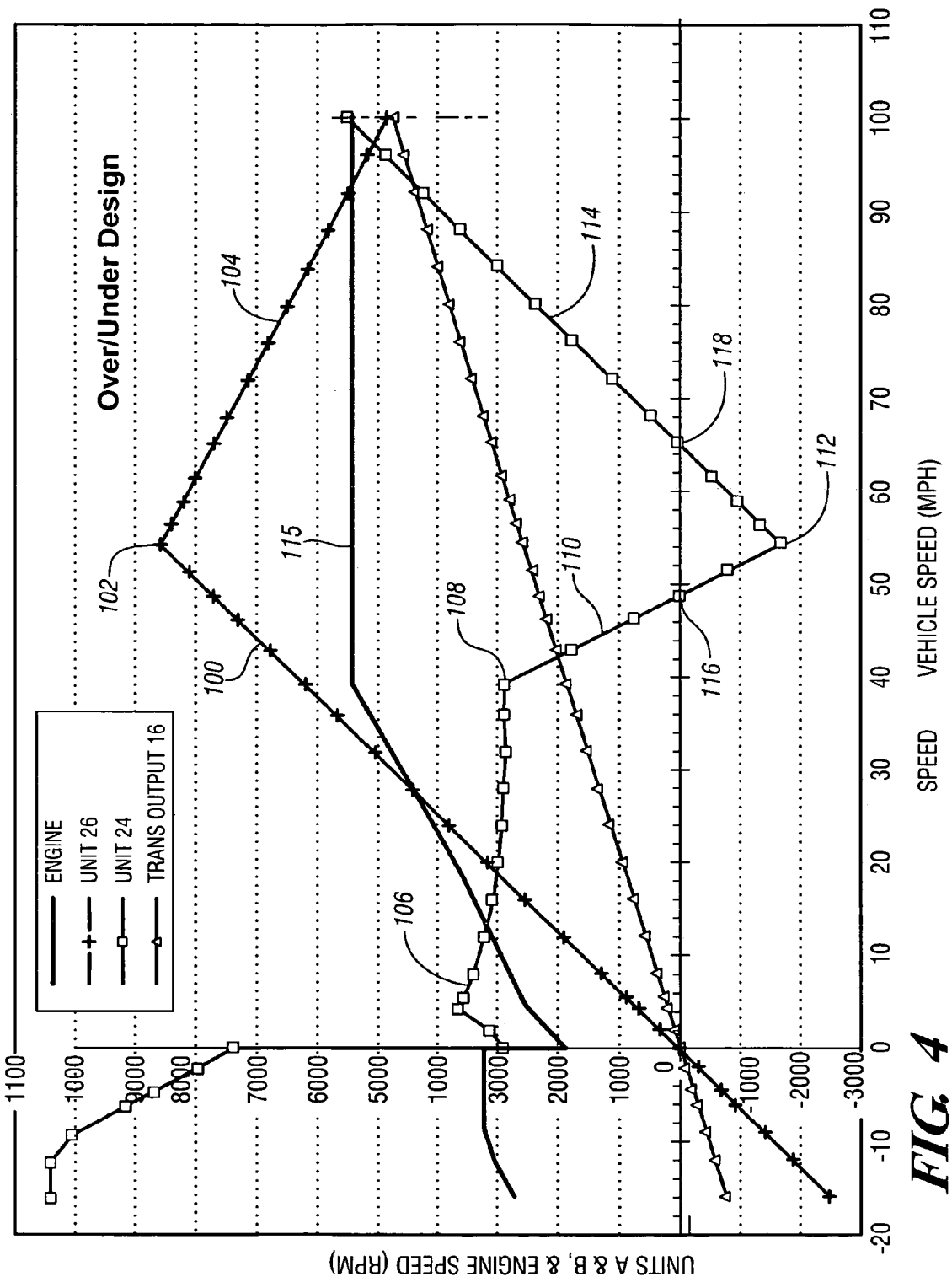
FIG. 4 is a graph of performance curves describing the speed of various components within the powertrain versus the speed of a vehicle in which the powertrain is incorporated.

The graph of FIG. 4 describes the speed of the various components of the powertrain during full throttle operation. As can be seen, the speed of electrical unit 26 proceeds along a line 100 from the neutral or zero speed in either direction—forward and reverse. During forward speed operation, the speed of electrical unit 26 proceeds upward or increases in positive speed to a point 102 and then decreases in speed along line 104 to the maximum speed of the vehicle. The speed of electrical unit 24 is controlled along a line 106 from the zero speed point to a point 108 at a continuously decreasing speed, and at a more rapidly decreasing speed from point 108 (along a line 110) to a point 112 after which the speed of unit 24 increases along a line 114 to the maximum speed of the vehicle. The engine speed is controlled along a line 115.

Between the points 108 and the maximum speed, the electrical unit 24 passes through the zero speed at points 116 and 118. These are generally termed mechanical points of operation, which are efficient operating points from a fuel and economy standpoint. From the origin to the point 116, the electrical unit 26 operates as a motor and the electrical unit 24 operates as a generator. From point 116 to the point 112 or point 102 (112 and 102 occur at the same vehicle speed), the electrical unit 24 operates as a motor and the electrical unit 26 operates as a generator.

At the points 112 and 102, the torque-transmitting mechanisms 34 and 32 are interchanged. This interchange occurs at a synchronous speed such that the interchange thereof is not apparent to the operator. From the point 112 to the point 118, the electrical unit 26 operates as a generator and from the point 102 to the point 118 the electrical unit 26 operates as a motor. From the point 118 out to the maximum speed point, the electrical unit 24 operates as a motor, and the electrical unit 26 operates as a generator.

The power transmission 14 also has a cruise condition during which the torque-transmitting mechanism 35 and the torque-transmitting mechanism 32 are simultaneously engaged. When the torque-transmitting mechanism 35 is engaged the electrical unit 26 is held stationary and the majority of the propulsion power for the vehicle is supplied by the engine 12. Thus, during the cruise operation the efficiency of the powertrain is increased considerably. Therefore, it is desirable with a transmission such as this to operate at a cruise condition when operating on a highway at substantially constant input to output ratio.

The radial stacking of the electrical units and the planetary gearsets provide for a shortened length of the EVT 14 such that it readily accommodates transverse mounted powertrains in front wheel drive vehicles.

It will also be apparent now to those skilled in the art that the planetary gearsets 28 and 30 are mounted within the radial package of the electrical units 24 and 26, respectively. The planetary gearset 28 is rotatably disposed within a rotor 120 of the electrical unit 24 while a stator 122 is of the electrical unit 24 is secured to the stationary portion of the transmission 14. The planetary gearset 30 is rotatably disposed within a rotor 124 of electrical unit 26 while a stator 126 is secured to the stationary portion of the transmission 14. This provides for a very compact length of the transmission.

The invention claimed is:

1. A powertrain having an electrically-variable transmission comprising:
   an engine;
   said electrically-variable transmission including an input shaft continuously drivingly connected with said engine;

a first electrical unit;

a second electrical unit;

a first planetary gearset rotatably disposed within said first electrical unit having a sun gear member continuously connected with said first electrical unit, a ring gear member and a planet carrier member continuously drivingly connected with an output member;

a second planetary gearset rotatably disposed within said second electrical unit having a sun gear member continuously connected with said second electrical unit, a planet carrier member continuously drivingly connected with an output member, and a ring gear member;

said ring gear member of said first planetary gearset being provided with a selectively engageable torque-transmitting mechanism for selective connection with said transmission input shaft;

said second planetary gearset being selectively connectible with a stationary portion of said transmission through a second selectively engageable torque-transmitting mechanism; and said output member of said first planetary gearset and said output member of said second planetary gearset being disposed in meshing relationship with a transfer gear means which in turn is meshingly engaged with a final drive mechanism of said transmission.

2. The powertrain defined in claim 1 further wherein:

said input shaft is drivingly connected with a hydraulic pump arrangement and with a planetary gear mechanism including a sun gear member continuously drivingly connected with said first electrical unit, a ring gear member continuously drivingly connected with an interconnecting gear member, and a planet carrier member drivingly connected with said input shaft;

said interconnecting gear member drivingly connected with a transfer gear which is continuously connected with said second electrical unit; and said transfer gear member being selectively connectible with said transmission housing with a third torque-transmitting mechanism.

* * * * *